(12) United States Patent
Lawless et al.

(10) Patent No.: US 11,351,723 B2
(45) Date of Patent: Jun. 7, 2022

(54) SYSTEMS, DEVICES, AND METHODS FOR MANUFACTURING THREE DIMENSIONAL OBJECTS VIA OXYGEN PERMEATION OF A GAS PERMEABLE MEMBRANE

(71) Applicant: CALT Dynamics Limited, County Wicklow (IE)

(72) Inventors: Ross Lawless, Newtownmountkennedy (IE); Irene Villafane, Newtownmountkennedy (IE)

(73) Assignee: CALT DYNAMICS LIMITED, County Wicklow (IE)

( * ) Notice: Subject to any disclaimer, the term of this patent is extended or adjusted under 35 U.S.C. 154(b) by 0 days.

(21) Appl. No.: 17/174,513

(22) Filed: Feb. 12, 2021

(65) Prior Publication Data

US 2021/0260817 A1 Aug. 26, 2021

Related U.S. Application Data

(60) Provisional application No. 62/979,740, filed on Feb. 21, 2020.

(51) Int. Cl.
*B29C 64/129* (2017.01)
*B33Y 30/00* (2015.01)
(Continued)

(52) U.S. Cl.
CPC .......... *B29C 64/129* (2017.08); *B29C 64/241* (2017.08); *B29C 64/264* (2017.08);
(Continued)

(58) Field of Classification Search
CPC .............................. B29C 64/124; B29C 64/129
See application file for complete search history.

(56) References Cited

U.S. PATENT DOCUMENTS

2016/0096331 A1* 4/2016 Linnell ................. B29C 64/241
264/494
2017/0197363 A1* 7/2017 Frantzdale ............ B29C 64/135
(Continued)

FOREIGN PATENT DOCUMENTS

WO 2017116990 A1 7/2017
WO 2019014098 A1 1/2019

OTHER PUBLICATIONS

Charati, S.G., et al., "Diffusion of Gases in Silicone Polymers: Molecular Dynamics Simulations", Macromolecules (1998) 31, pp. 5529-5535.

(Continued)

*Primary Examiner* — Matthew J Daniels
*Assistant Examiner* — Paul Spiel
(74) *Attorney, Agent, or Firm* — Cantor Colburn LLP

(57) ABSTRACT

An additive manufacturing device and a method of fabricating a 3D object is provided. The device includes a vessel configured to rotate about an axis and a membrane disposed to form a floor of the vessel. A build plate is movable between a first position and a second position, the build plate being positioned a predetermined distance apart from the membrane in the first position. A light source is arranged to direct electromagnetic radiation through the membrane towards the build plate. A processor is provided that is responsive to executable computer instructions for rotating on a periodic, aperiodic, or continuous basis, the vessel to oxygenate the membrane.

4 Claims, 9 Drawing Sheets

(51) Int. Cl.
  *B29C 64/393* (2017.01)
  *B29C 64/241* (2017.01)
  *B29C 64/264* (2017.01)
  *B33Y 50/02* (2015.01)
  *B33Y 10/00* (2015.01)
  *B33Y 70/00* (2020.01)

(52) U.S. Cl.
  CPC ............ *B29C 64/393* (2017.08); *B33Y 30/00* (2014.12); *B33Y 50/02* (2014.12); *B33Y 10/00* (2014.12); *B33Y 70/00* (2014.12)

(56) References Cited

U.S. PATENT DOCUMENTS

2019/0009470 A1* 1/2019 Zitelli .................... B33Y 10/00
2020/0254685 A1* 8/2020 Innes .................... B29C 64/393

OTHER PUBLICATIONS

De Bo, Inge, et al., "Investigation of the permeability and selectivity of gases and volatile organic compounds for polydimethylsiloxane membranes" Journal of Membrane Science 215 (2003) pp. 303-319.
Frisch, H.L., et al., "Diffusion of small molecules in polymers" (1983) Critical Reviews in Solid State and Materials Sciences, 11:2, pp. 123-187.
International Search Report and Written Opinion for International Application No. PCT/IB2021/051386 dated May 19, 2021, (12pgs).

* cited by examiner

SYSTEMS, DEVICES, AND METHODS FOR MANUFACTURING THREE DIMENSIONAL OBJECTS VIA OXYGEN PERMEATION OF A GAS PERMEABLE MEMBRANE

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

TECHNICAL FIELD

The present disclosure relates to systems, apparatuses, and methods for additive manufacturing or printing of three dimensional (3D) objects, and more specifically, to additive manufacturing or 3D printing (3DP) using a vessel, which contains a photopolymer for printing, that can be rotated, with an angle of operation not parallel to a direction of gravity.

BACKGROUND

Some types of manufacturing create physical objects by laying down or building up many thin layers of material in succession, this is sometimes referred to as "3D Printing." A 3D printer can include a container for holding a liquid polymer that can be cured to produce a 3D object. The printer can include a light source and a controller that selectively controls the light source to expose the liquid polymer to light print the successive layers of the 3D object.

While existing 3D printers are suitable for their intended purposes the need for improvement remains, particularly in providing a 3D printing device having the features described herein.

SUMMARY

According to one aspect of the disclosure an additive manufacturing device is provided. The device includes a vessel configured to rotate about an axis and a membrane disposed to form a floor of the vessel. A build plate is movable between a first position and a second position, the build plate being positioned a predetermined distance apart from the membrane in the first position. A light source is arranged to direct electromagnetic radiation through the membrane towards the build plate. A processor is provided that is responsive to executable computer instructions for rotating on a periodic, aperiodic, or continuous basis, the vessel to oxygenate the membrane.

In addition to one or more of the features described herein, or as an alternative, further embodiments of the device may include the vessel being disposed on an angle, the vessel having a cure area and an oxygenation area, the cure area being lower than the oxygenation area. In addition to one or more of the features described herein, or as an alternative, further embodiments of the device may include the build plate having a bottom surface that is parallel with the membrane. In addition to one or more of the features described herein, or as an alternative, further embodiments of the device may include the light source being arranged to direct electromagnetic radiation perpendicular to the membrane.

In addition to one or more of the features described herein, or as an alternative, further embodiments of the device may include a wiper element disposed within the vessel, the wiper being configured to remove photopolymer from the membrane. In addition to one or more of the features described herein, or as an alternative, further embodiments of the device may include a permeation element disposed adjacent the membrane, the permeation element having a vent arranged to flow a gas containing oxygen onto the membrane. In addition to one or more of the features described herein, or as an alternative, further embodiments of the device may include the build plate continuously moving relative to the membrane during operation.

In addition to one or more of the features described herein, or as an alternative, further embodiments of the device may include the membrane being made from polydimethylsiloxane. In addition to one or more of the features described herein, or as an alternative, further embodiments of the device may include the light source being a dynamic digital light source. In addition to one or more of the features described herein, or as an alternative, further embodiments of the device may include the dynamic digital light source being a digital light projection system.

According to another aspect of the disclosure a method of fabricating a 3D object is provided. The method includes providing a vessel having a floor at least partially defined by a membrane. The vessel is rotated on a periodic, aperiodic or continuous basis to oxygenate the membrane. A build plate is moved a predetermined distance from the membrane. A photopolymer is disposed in the vessel. Electromagnetic radiation is emitted through the membrane into at least a portion of the photopolymer.

In addition to one or more of the features described herein, or as an alternative, further embodiments of the method may include disposing the vessel on an angle to define a cure area and a oxygenation area, the cure area being lower than the oxygenation area, the photopolymer being disposed in the cure area. In addition to one or more of the features described herein, or as an alternative, further embodiments of the method may include removing photopolymer from the membrane when the vessel is rotated. In addition to one or more of the features described herein, or as an alternative, further embodiments of the method may include flowing a gas containing oxygen onto the membrane when the vessel is rotated. In addition to one or more of the features described herein, or as an alternative, further embodiments of the method may include the step of moving of the build plate is performed in a direction perpendicular to the membrane.

In addition to one or more of the features described herein, or as an alternative, further embodiments of the method may include the step of moving of the build plate is performed continuously during operation. In addition to one or more of the features described herein, or as an alternative, further embodiments of the method may include the step of emitting of electromagnetic radiation emitted by a dynamic digital light source. In addition to one or more of the features described herein, or as an alternative, further embodiments of the method may include the dynamic digital light source is a digital light projection system. In addition to one or more of the features described herein, or as an alternative, further embodiments of the method may include the step of rotating of the vessel to oxygenate the membrane and the emitting of electromagnetic radiation into at least a portion of the photopolymer occurs simultaneously.

BRIEF DESCRIPTION OF IMAGES

An understanding of the features of the disclosure herein may be had by reference to the appended drawings, which illustrate the method and system of the disclosure, although it will be understood that such drawings depict preferred embodiments of the disclosure and, therefore, are not to be considered as limiting its scope with regard to other embodiments which the disclosure is capable of contemplating. Furthermore, elements or components that are described with reference to any one figure may be interchanged with those of other figures without departing from the scope of the present teaching.

DETAILED DESCRIPTION

Figure 1:
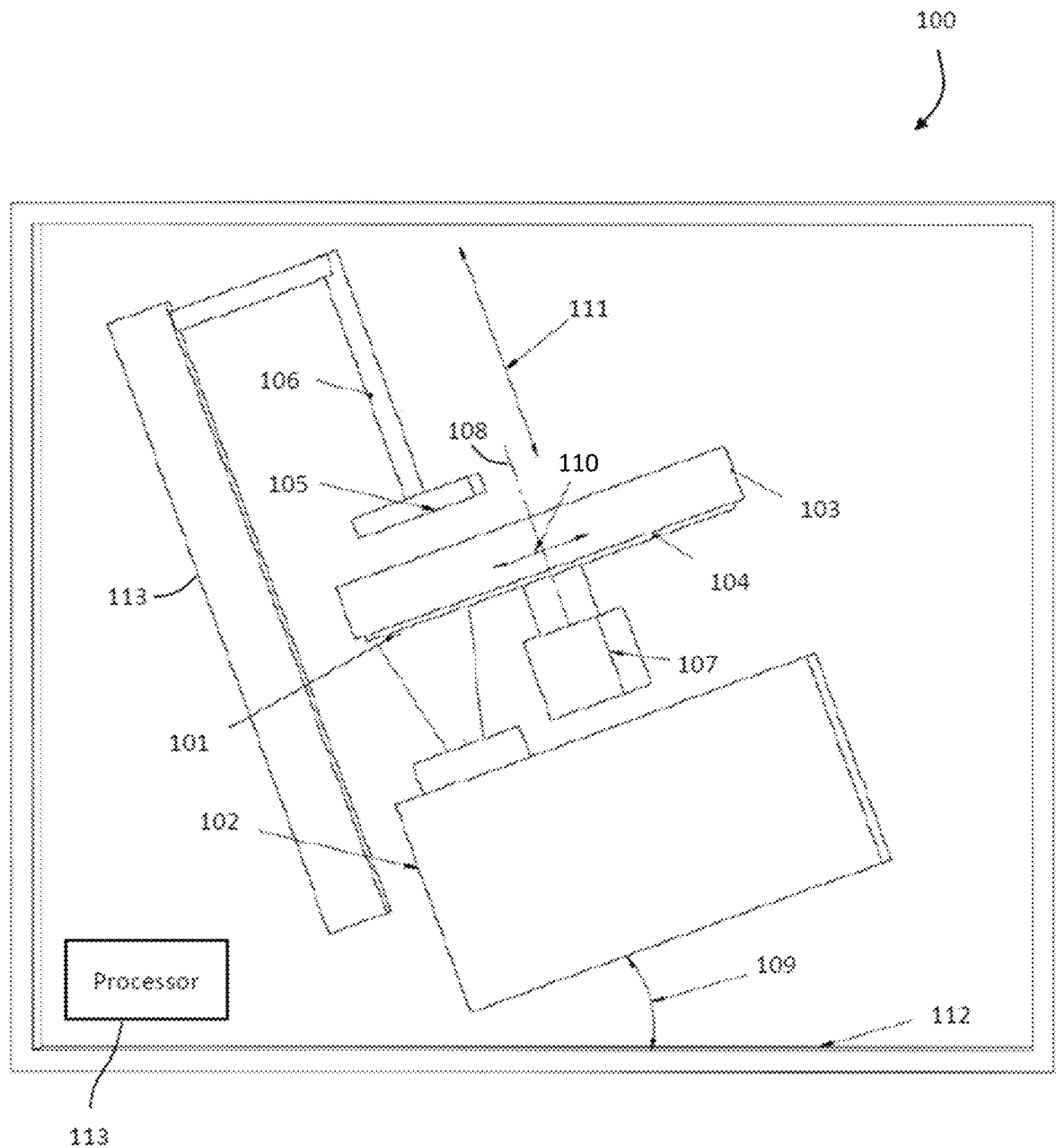
FIG. 1 is a schematic view of an additive manufacturing device in accordance with an embodiment.

Processes and devices described herein relate to additive manufacturing, also referred to as 3DP. More specifically, such processes and devices relate to an additive process of forming objects by curing a photopolymer one layer after another in a continuous rather than step wise fashion via continuous oxygenation of a PDMS membrane (e.g., continuous exposure of the PDMS membrane to oxygen) on its upper surface during the printing process. In some embodiments, a process for additive manufacturing uses a rotary cylindrical vessel comprising a gas permeable and optically clear floor mounted at an angle of tilt relative to the earth (e.g., a direction of gravity) or a level surface. In some embodiments, processes and devices described herein comprises a build plate and light source mounted parallel to the vessel.

Embodiments of the present disclosure relates to systems, apparatuses, and methods for additive manufacturing or printing of three dimensional (3D) objects, and more specifically, to additive manufacturing or 3D printing (3DP) using a vessel, which contains a photopolymer for printing, that can be rotated, e.g., in an automated fashion, with an angle of operation not parallel to the earth (e.g., not parallel to a direction of gravity, such as an inclined surface or plane). In one or more embodiments, this vessel can be configured such that it can be mounted inside of a manufacturing device (e.g., a 3D printer). When mounted, the vessel's orientation is not parallel to earth (e.g., not parallel to a direction of gravity) and as such any fluid contained therein rests to one side of the vessel rather than spread evenly across an opening of the vessel and/or along a length of the vessel. In some embodiments, the vessel contains a volume of photopolymer which is accessible to a print bed and/or a build arm, which are subcomponents of the manufacturing device (e.g., 3D printer). The print bed can be mounted in parallel to the vessel's bottom surface, which comprises a membrane. In some embodiments, systems and methods described herein can be used with a light source that is a dynamic digital light source, while in other embodiments, the light source can be a light source other than a dynamic digital light source but is capable of producing a suitable photomask within the desired spectrum of electromagnetic radiation. The membrane may have a solid, light transmissive, backing to improve its rigidity.

In accordance with one or more embodiments, 3D manufacturing or additive manufacturing devices and methods may use computer controlled light engines to dynamically direct light at certain portions of a photopolymer. A vessel containing a photopolymer can form a part of the 3D manufacturing device. Objects manufactured using a 3D manufacturing device are typically cured within a vessel against an optically clear window. Once cured, a force exists that can hold the cured layer against the window. This force can be, for example, primarily comprised of a vacuum force (area of low pressure) created by the photopolymer shrinking and van der Waals forces to a lesser extent. This force is overcome in order to raise/lower the print bed into position for curing the next layer of photopolymer. The mechanism and/or method used to overcome this force can be referred to as a release mechanism herein. The release mechanism is configured to be both gentle (e.g. low application of force) and fast so as to not damage the cured layer while moving while also optimizing the print speed. In one or more embodiments, the devices and methods described herein simultaneously allow for continuous or repeated oxygen permeation of a Polydimethylsiloxane (PDMS) membrane and continuous photopolymer exposure. It can be understood that "continuous," as used in the context described herein, refers to a lack of a separation or release step in the printing process (e.g., between a cured photopolymer and a bottom of a vessel), but can include other delays, e.g., due to the digital nature of the equipment.

Existing methods of manufacturing a 3D object incorporate cycled oxygenation or low area pre-print oxygenation or attempt to oxygenate through permeation from the back side (the side not in contact with the photopolymer). The presence of oxygen can prevent the photopolymer from curing so any oxygen that permeates, e.g., oxygen that permeates the gas permeable PDMS membrane, can result in a thin layer of oxygen at a surface of the membrane and thus a thin layer of uncured photopolymer can be present post curing, which can enable gentle separation of the printed part (e.g., cured photopolymer) and vessel window. Without this oxygenation, the PDMS will suffer structural damage upon repeated curing's and separations from the bed. The mechanical strength properties of PDMS can make it difficult to allow for continuous oxygenation from the side of a PDMS membrane not in contact with the photopolymer because an optically clear backing is usually used for rigidity. The PDMS is applied to it for mechanical strength and it is used to support the weight of the photopolymer acting on the PDMS. Additionally, the permeability of the PDMS material may be dependent upon its thickness and thus relatively thin layers can enable greater permeability but prove impractical at scale due to the forces acting upon the membrane during the printing process. For printing purposes, it therefore can be more desirable to have the available area for oxygen permeation be the upper side of the PDMS membrane, i.e., the side in contact with the photopolymer (e.g., resin) where there is typically no oxygen present. Also common in the art is the cycled oxygenation of the PDMS from the top side through the use of a wiper mechanism residing in the vessel. In this embodiment, the wiper is passed through the polymer exposing the PDMS to the surrounding air momentarily after each layer. The disadvantage with this prior art configuration is that the oxygenation time is low and the printing process must stop for oxygenation to occur, impacting print time. Also, the mechanical force of the wiper against the PDMS, which substantially clears resin from it for oxygenation momentarily, deflects the soft PDMS, altering layer tolerances and reducing accuracy. In accordance with embodiments herein, devices and methods are described that allow for the oxygenation of this upper side of the PDMS while printing with photopolymer in the vessel, providing a strong substrate backing for the membrane and also allowing for relatively thicker membrane thicknesses, e.g., such as 0.25 mm-20 mm, without stopping the printing process for oxygenation of the PDMS. Embodiments of these methods also allows for oxygen permeation to begin at the working surface such that any permeation aids in the inhibition of curing. In other words, oxygen permeation of the membrane begins at the surface in contact with the photopolymer (e.g., resin). Furthermore, the oxygenation time is controllable.

In accordance with one or more embodiments, the additive manufacturing and printing processes described herein provide several advantages over other 3D printing methods, including but not limited to, for example, higher manufacturing speeds, because such systems and methods do not require the printing process to have an "oxygenation" step (e.g., a wiper mechanism) which stops the curing process and the printing process moves continuously in one direction as opposed to having to lift and lower the print bed on each cycle to afford a wiper, adding to the cycle time. According to one or more embodiments, the devices and methods described herein can also be scaled larger than that of PDMS vessel with no rigid backing. Also, as oxygen permeation is increased or maximised so too is the life span of the PDMS.

A device according to the present disclosure can include a 3D printer, a vessel (e.g., a rotary off-axis vessel) that contains a volume of a photopolymer. In addition to these components, the device can also include one or more of: a build plate that can be held parallel to a bottom surface or opening of the vessel (e.g., a print bed or surface upon which an object can be printed), a build arm attached to a print bed which attaches to the printer once installed, and/or a suitable light source that is mounted perpendicular to the vessel such that the light emitted from it is parallel to the vessel window.

The devices set forth herein have applications in, for example, the industrial production of parts, spare parts as well as rapid prototyping, e.g., in automotive manufacturing, product design or consumer applications, where speed and part quality are important. The disclosed devices also have applicability in Science, Technology, Engineering, the Arts and Mathematics (STEAM) applications and other educational applications, including educational programs.

The descriptions herein refer to an additive manufacturing process as well as to device(s) that utilize said process. Processes described herein can enable commercialization of high-speed printers. These processes can be different from currently available processes that use a non-continuous method of fabrication of objects and methods that do not continuously oxygenate a gas permeable membrane vessel floor from the upper side. In embodiments described herein, a process, herein referred to as the Off-Axis Permeation (OAP) process, uses an unlevel vessel (e.g., a vessel that is inclined) and a continuous separation method to build up (e.g., manufacture) a 3D object with photopolymer materials. In some embodiments, the projected light used in the manufacturing process (e.g., to cure the photopolymer) can be in the ultra violet range of the electromagnetic spectrum, but other wavelengths of light may also be used as suitable for curing specific types of photopolymers. In embodiments described herein, the central axis of the build plate, vessel, and light source of a manufacturing device are tilted at an angle of inclination such that the print head does not move directly vertically upward, e.g., with respect to a direction of gravity or a level surface, during printing but rather moves perpendicular and/or substantially perpendicular to the vessel floor which is tilted.

Certain methods or processes for additive manufacturing of photopolymer materials may use an oxygenation method (e.g., wiper mechanism) that requires stopping the curing process during the printing process. Processes and devices described herein do not require the build plate to stop or reverse direction, which can have significant time savings throughout the printing process. For example, such processes and devices do not require the build plate to lift, stop, oxygenate and then drop on each layer of photopolymer curing process. Moving continuously in one direction has significant time saving advantages and lowers the distance travelled by the print head per print which has maintenance advantages.

Certain methods or processes for additive manufacturing of photopolymer materials may oxygenate the PDMS from the lower surface i.e the surface not in contact with the resin during the printing process. Processes and devices described herein oxygenate the PDMS from the upper surface, meaning the oxygen does not have to permeate through the thickness of the PDMS before being effective. Rather oxygen permeation in this instance has an immediate effect on the ability to impede curing as desired. Furthermore, as the back surface does not have to be exposed to oxygen, it can have a rigid backing such as acrylic. This increases the rigidity of the vessel allowing for larger vessels to be built which can contain more photopolymer. Both of which are desirable features.

According to 'H. L. Frisch & S. Alexander Stern (1983): Diffusion of small molecules in polymers, Critical Reviews in Solid State and Materials Sciences, 11:2, 123-187', the diffusion of a gas through PDMS can be described by Frick's law, stating: 'The diffusion of a chemical species of low molecular weight in a polymer occurs as a result of random motions of individual molecules of the species; such motions are known in kinetic theory as "random walk". If a concentration gradient of this species (the "penetrant") is established across some arbitrary reference section in the polymer, a net transport of penetrant will be induced across the section in the direction of decreasing concentration. The net transport can take place in spite of the fact that the motions of the penetrant molecules are random just because there are more penetrant molecules on one side of the reference section than on the opposite side.' The process described above can be expressed quantitatively from a macroscopic viewpoint, in most cases of interest here, by Fick's laws of diffusion. For one-dimensional diffusion of some penetrant species in a homogeneous, isotropic polymer, these laws are:

$$J = -D \delta c / \delta x \qquad \text{(Eq. 1)}$$

and $$\delta c/\delta t = \delta/\delta x(D(\delta c/\delta x)) = D((\delta^2)/\delta x^2) + (\delta D/\delta c)(\delta c/\delta x)^2 \quad \text{(Eq. 2)}$$

where J is the diffusion flux or rate of diffusion across a unit reference area of the penetrant species, c is the local concentration of the species at a position coordinate x, t is the time, and D is a binary "diffusion coefficient", commonly with dimensions of (length)'/time. Equations 1 and 2 assume the absence of convective flows, temperature gradients, and external forces (e.g., electrical or gravitational).' In other words, diffusion will always occur from the side with the greatest concentration of gas, in our case the upper surface of the PDMS, towards the opposite side of the membrane. Furthermore, the permeation/diffusion of the gas has dependencies on concentration and time. With reference to the printing device described herein, exposure of the PDMS to the surrounding air from the top side for a definable time is useful for controlling the release characteristics of the PDMS during printing. It should also be noted that the pressurised delivery of a gas such as air to the PDMS increases the concentration of oxygen available for permeation as referenced in the equation above. A similar description of the diffusion of a gas in PDMS is described by S. G. Charati and S. A. Stern: Diffusion of Gases in Silicone Polymers: Molecular Dynamics Simulations (1998) as well as by Inge De Bo, Herman Van Langenhove, Peter Pruuost, Jeroen De Neve, Jan Pieters, Ivo F. J. Vankelecomc, Erik Dick: Investigation of the permeability and selectivity of gases and volatile organic compounds for polydimethylsiloxane membranes (2002) in the Journal of Membrane Science.

Off Axis Permeation Printing Process (OAP)

Referring now to FIG. 1 an example additive manufacturing device 100 is shown as a 3D printing device or 3D printer, according to embodiments described herein. The system includes an photomask 101. The system 100 further includes a light source 102 (e.g., Digital Light Projection system (DLP), and a cylindrical vessel 103 having a bottom 104. The vessel 103 may contain a photopolymer (e.g., resin) for printing. The bottom 104 of the vessel may be formed of a gas permeable material suitable for curing photopolymers against its surface backed by a rigid optically clear UV transmissive material with sufficient mechanical strength. Examples of suitable backing materials include but are not limited to acrylic and glass. A build plate 105 is provided that provides an area onto which a printed object can be printed onto. During printing, the object being printed can adhere to a bottom surface of the build plate 105 with greater force than to a bottom of the vessel 103. A build arm 106 is provided that can be used to move the build plate 105 away from the window during a printing process. A rotary drive mechanism 107 is used to rotate the vessel 103 about the axis 108 (e.g. a central axis) during printing. In an embodiment, the vessel is rotated or tilted at an angle of inclination 109 during operation. In an embodiment, the vessel 103 has a direction of motion as indicated by the arrow 110. In an embodiment, the build plate 105 has a direction of motion indicated by the arrow 111. As depicted in FIG. 1, the angle of inclination 109 of the vessel 103 and build plate 105 can be the same. In the illustrated embodiment, the components of the manufacturing device 100 are disposed within a frame or enclosure 112.

In an embodiment, the OAP process uses a vessel 103 that is tilted, e.g., with reference to earth (e.g., a direction of gravity) and/or a level surface, containing a photopolymer; a photomask 101 produced by a digital or other light source 102 of a suitable wavelength, which represents a "slice" or cross section of the object to be cured for the current layer. A slice or layer, for example, represents the geometry of the object being printed at a particular height (e.g., a height along an axis 306, as depicted in FIG. 3) at increments of the layer height. The first slice can represent the bottom of the object as viewed from above. The second slice can be the geometry of the object one layer-height higher and so on until the last slice, representing the top of the object, is printed. The process can use a build plate 105, which can be a component of the 3D printer. The vessel 103, build plate 105 and light source 102 can be all at the same (or substantially similar), tilted, angle of inclination 109 as is shown in FIG. 2.

Figure 2:
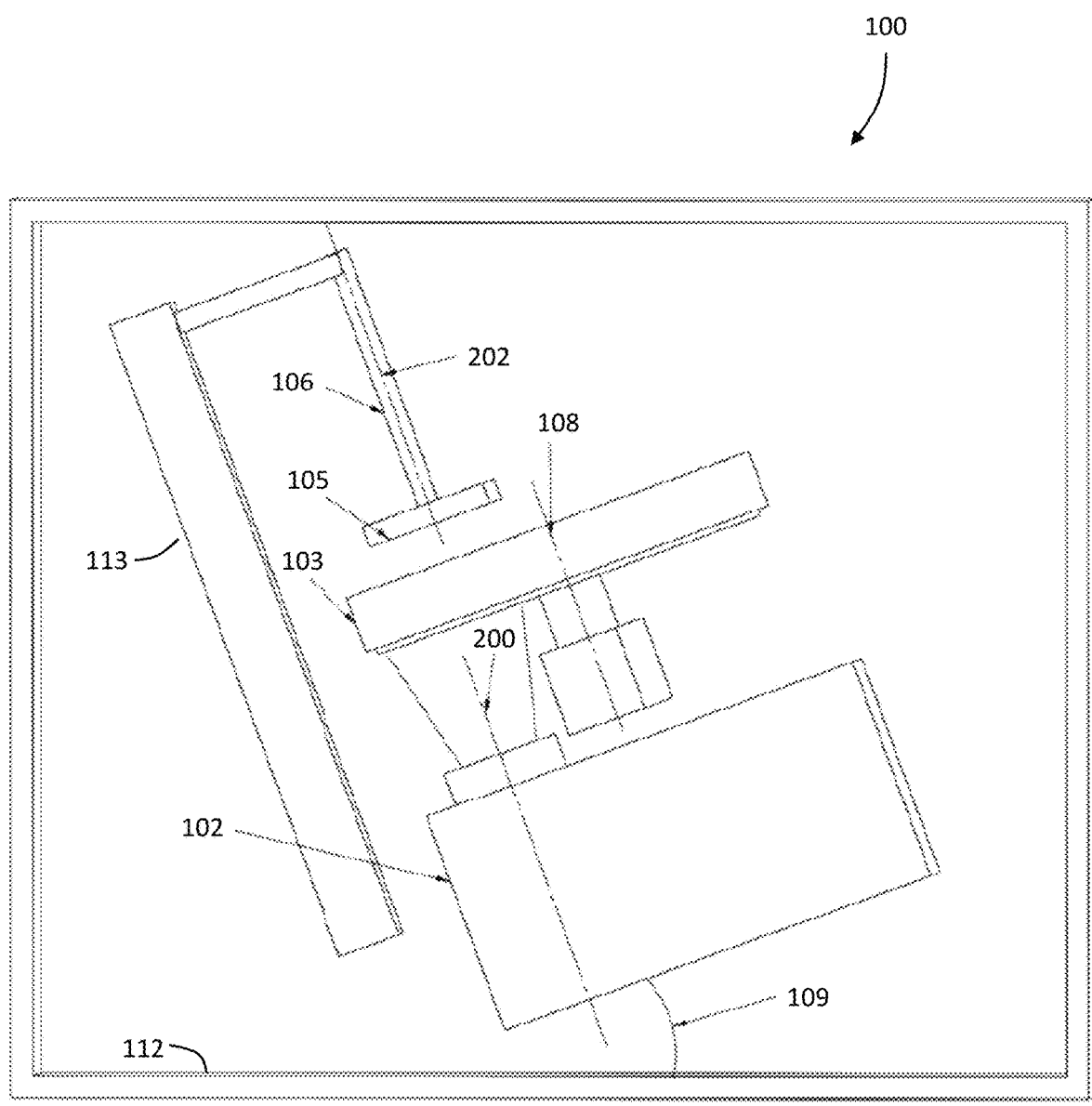
FIG. 2 depicts the centre line of axis of several components of the manufacturing device.
Figure 3:
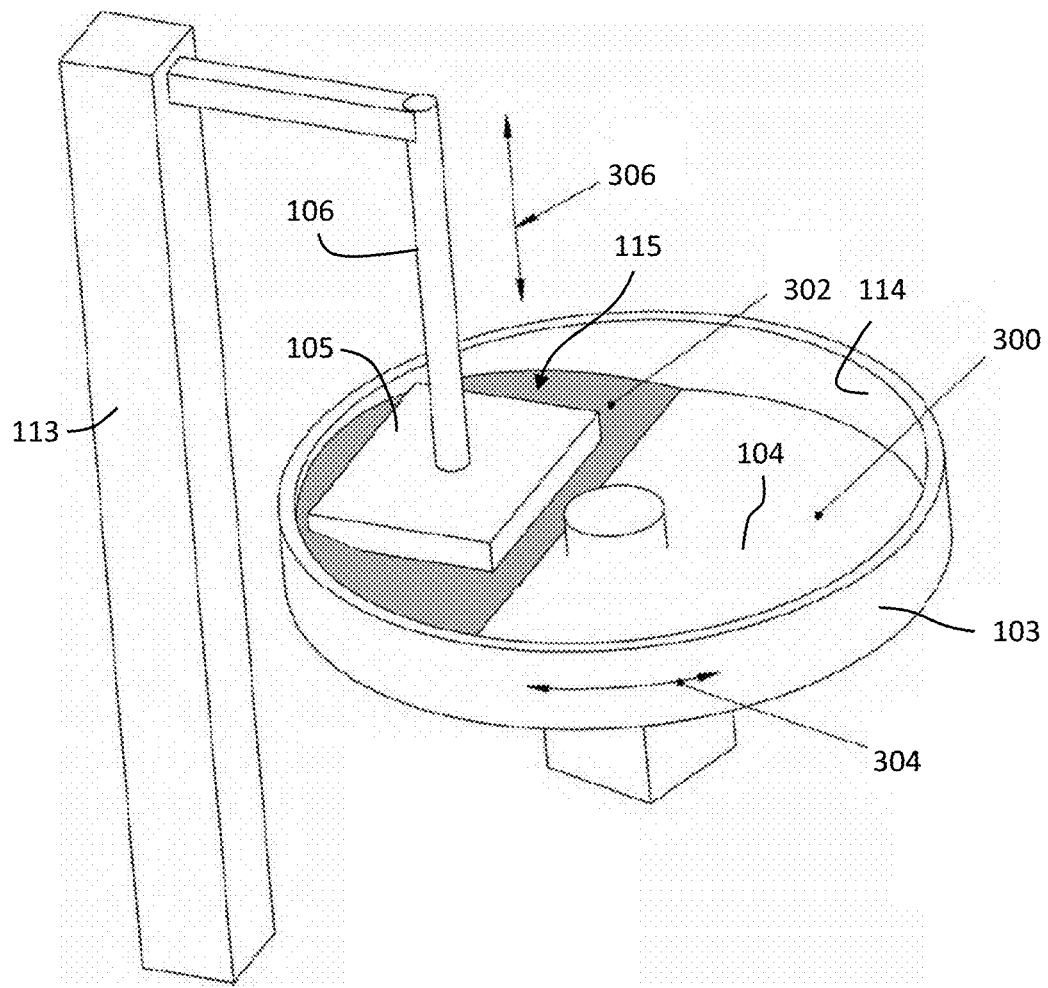
FIG. 3 is a partial perspective view of the additive manufacturing device of FIG. 1 in accordance with an embodiment.
Figure 4:
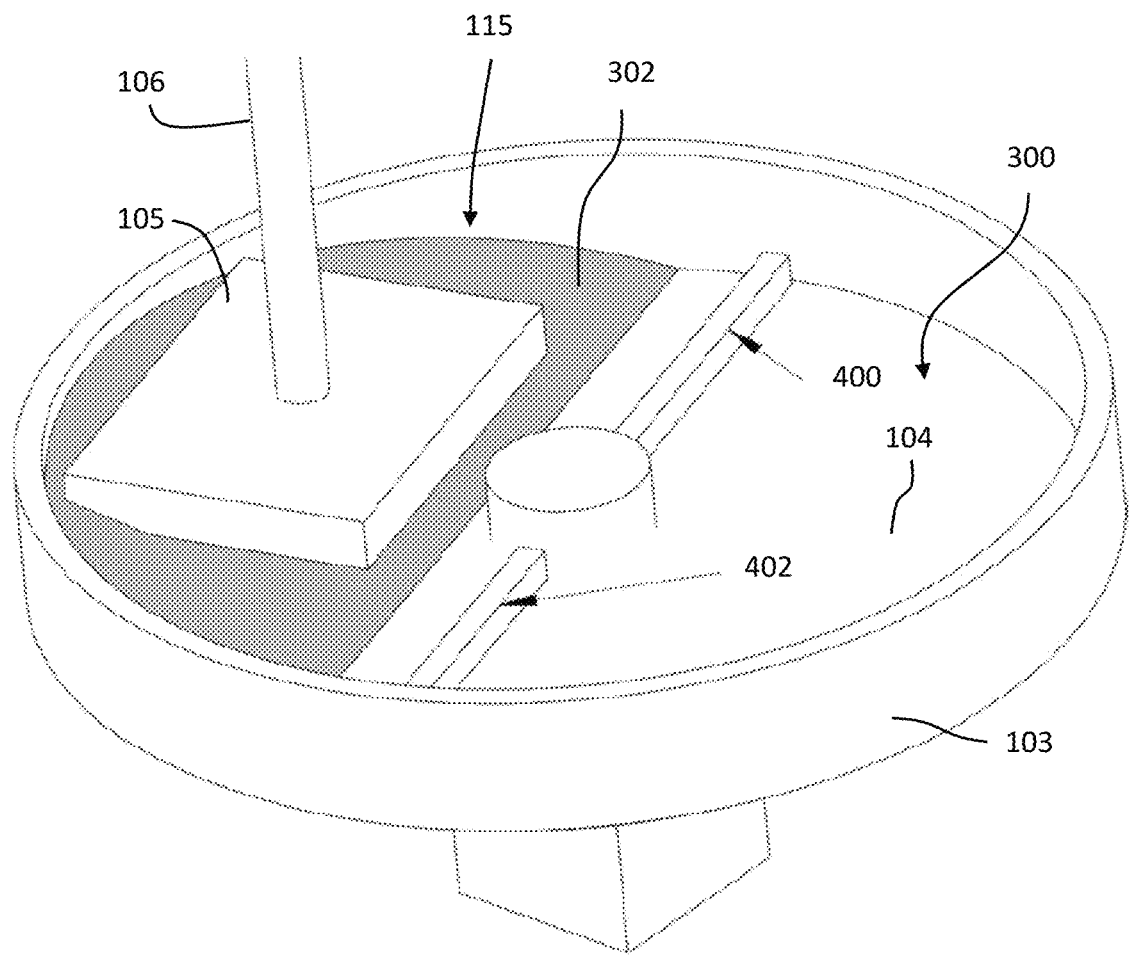
FIG. 4 is a partial perspective view of the additive manufacturing device in accordance with another embodiment.
Figure 5A:
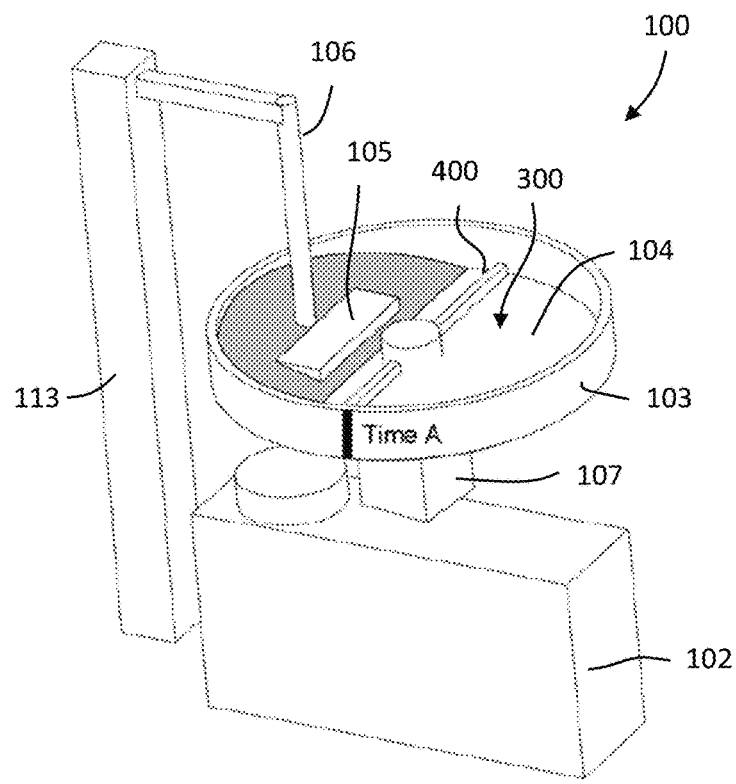
FIG. 5A and FIG. 5B are perspective views of the additive manufacturing device of FIG. 4 at a time A and time B respectively.
Figure 5B:
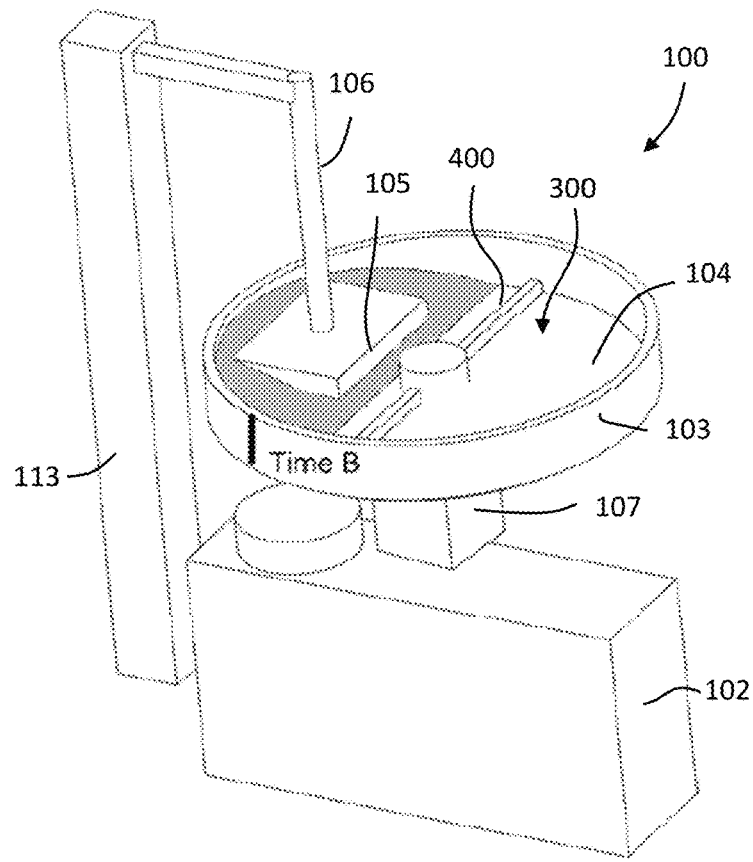
Figure 6:
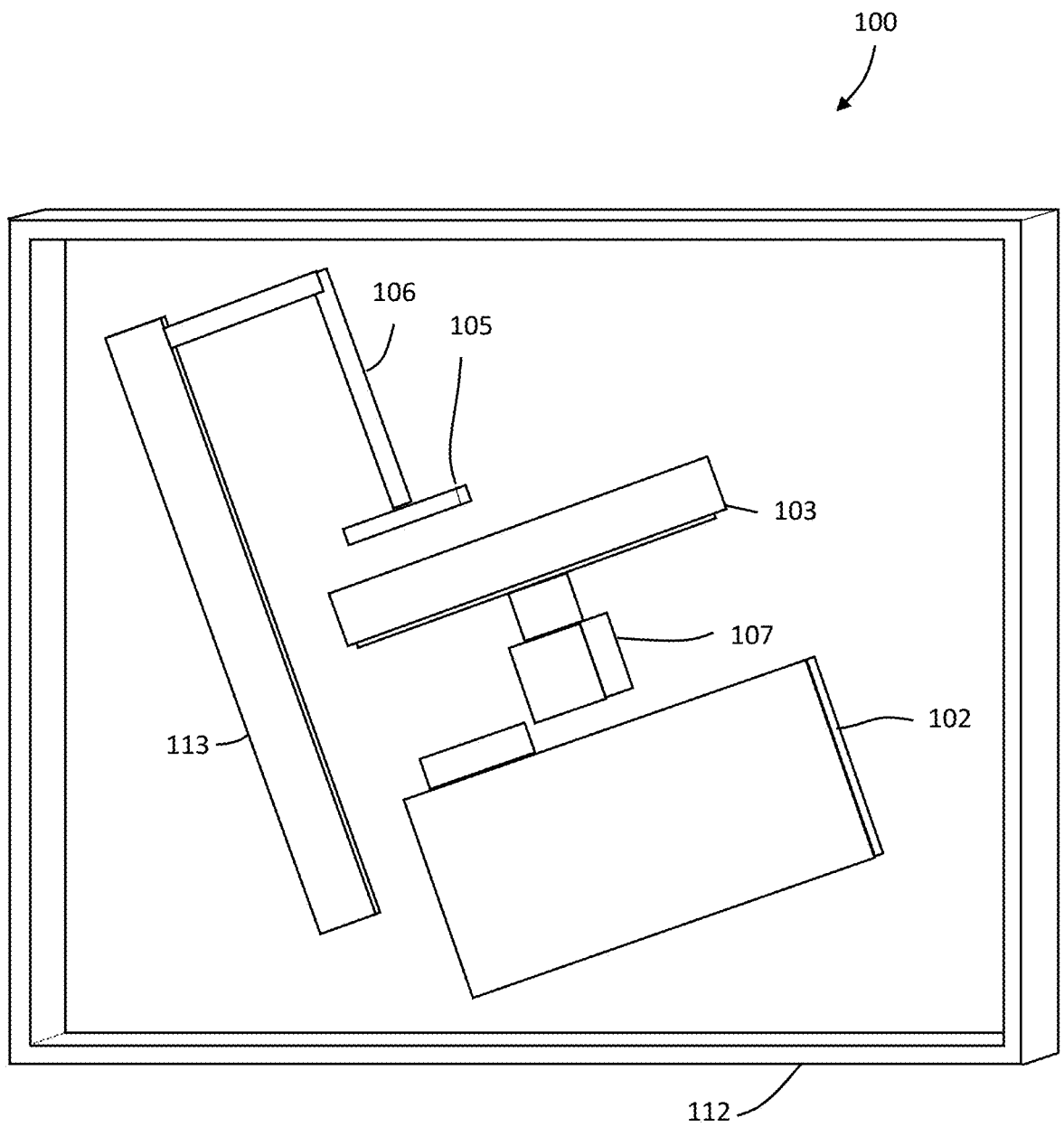
FIG. 6 is a front perspective view of the additive manufacturing device in accordance with an embodiment.
Figure 7:
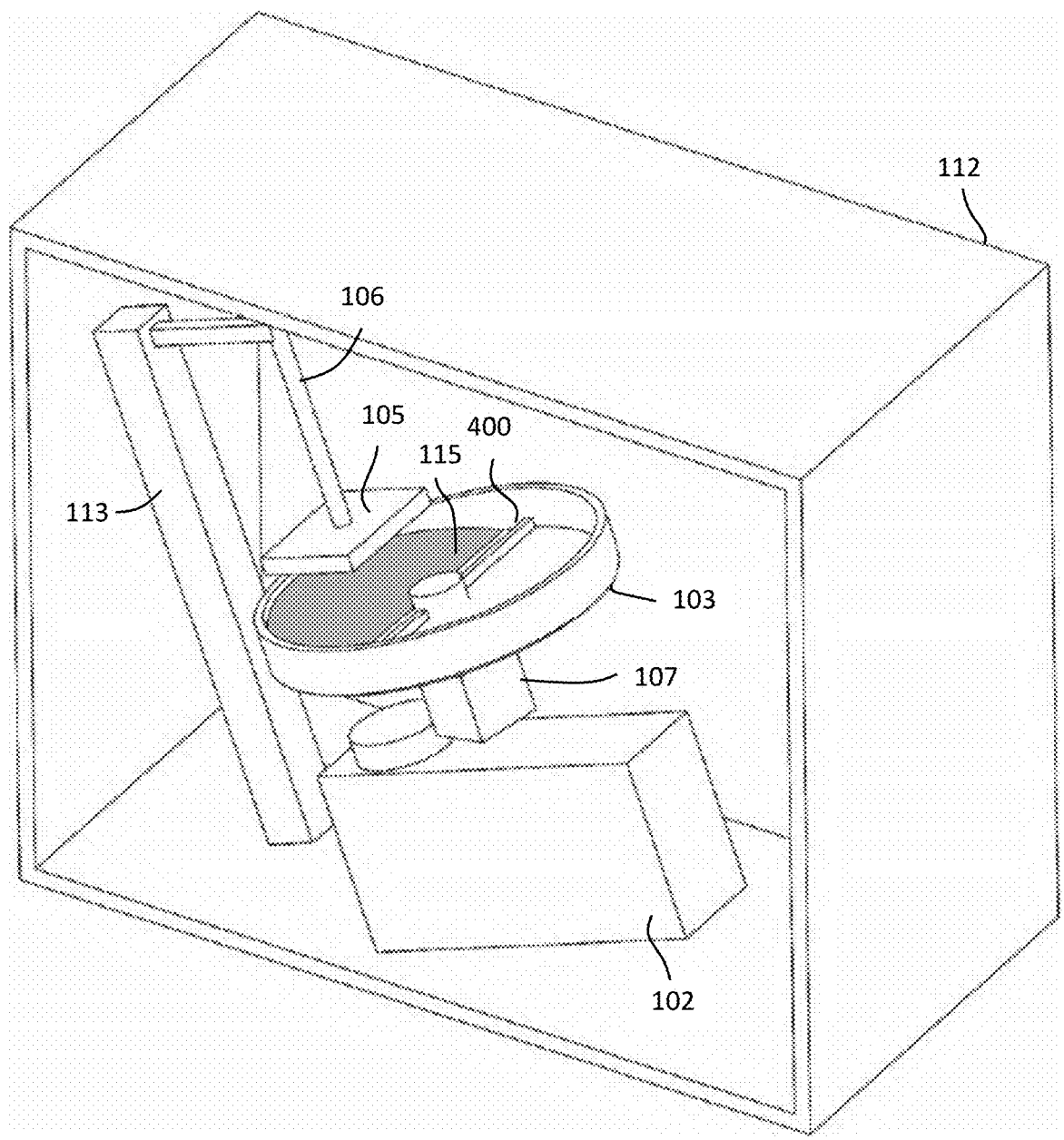
FIG. 7 is a perspective view of the additive manufacturing device of FIG. 4.

As shown in FIG. 2, a sufficient angle of inclination 109 may be desired in order to make efficient use of the manufacturing, e.g., to optimise the size of the vessel compared to a maximum build area. In an embodiment, the center axis 200 of the light source 102, the center axis 202 of the build arm 106, and the axis 108 are parallel.

To manufacture a particular object, a build plate 105 is lowered (via the build arm 106) into a bottom portion 104 of the vessel 103 such that a bottom surface of the build plate 105 is 1-layer height away from the top surface of a bottom 104 of the vessel 103. Such lowering can be accomplished via an on-board processor 113 that can control a movement of the build plate 105 in an automated fashion. The build plate 105 can be attached to the build arm 106, which in turn can be attached to other portions of the 3D printing device 100. The light source 102 is then turned on, such that its light passes through the transmissive portions of the underside of the vessel 103 and subsequently cures the photopolymer in a cure area 302 (FIG. 3), according to a photomask pattern 101. Based on the pattern formed by the light that is transmitted, a layer of the object can be cured (e.g., printed). The build plate 105 with the cured layer of photopolymer is then raised and separated from the bottom 104 of the vessel 103 or membrane, where gentle separation is achieved because oxygen is present at the surface of the membrane.

The presence of oxygen can inhibit the cure of the photopolymer, and thus a thin layer of uncured liquid polymer can be present between the cured polymer and membrane. This reduces the negative pressure that forms (e.g., prevents a significant vacuum force from forming) between the printed part (e.g., including layer(s) of cured photopolymer) and the membrane, e.g., due to the polymer shrinking during curing, allowing for gentle (e.g., lower force) separation. It should be appreciated that the device described herein maintains the presence of oxygen. While the build plate 105 is lifting, the vessel 103 can also rotate, ensuring that the area below the printed part that will be cured next will be cured against a freshly oxygenated piece of membrane (e.g., a new portion of membrane) that has not been depleted of oxygen in the last cure cycle (e.g., the cure cycle for the last layer of photopolymer).

As the build plate 105 lifts and/or the vessel 103 rotates (or continues to rotate), photopolymer can flow (e.g., continuously) into a space between the cured polymer and the vessel membrane floor (i.e. bottom 104). The projected image from the light source 102 can be changed, e.g., in synchronicity, with the vessel 103 and build plate motion. In some embodiments, the light source 102 provides a dynamic mask, which can be similar to a video (as opposed to showing a succession of slow moving images individually) as the build plate 105 moves away from the membrane 104 while the rotary vessel 103 exposes a new portion of the membrane floor 104 to oxygen, increasing the amount of oxygen present at the surface of the gas permeable membrane for the next time a part (e.g., layer of photopolymer) is cured against the membrane. In some embodiments, the movement of the build plate 105 (along the direction of arrow 111) and/or vessel 103 (rotated along the direction indicated by arrow 304) can be continuous or substantially continuous. This process continues until the object is built up (e.g., manufactured).

Additive Manufacturing Device Utilizing a Rotary Separation Vessel.

Devices described herein, such as example devices set forth in FIGS. 1-7 can include components required for a printing process, including, for example, an additive manufacturing device main body (e.g., a 3D printer) comprising a Rotary Separation Vessel (RSV) described herein (e.g., vessel 103 as described with reference to the figures) alongside a number of subcomponents.

3D Printer

As shown in FIGS. 1-7 the additive manufacturing device 100 can include a build arm 106 attached to a linear guide axis and motion components 113. The build plate 105 is attached to the build arm 106 and is movable within the vessel 103. The rotary vessel 103 comprising a gas permeable membrane floor 104, and a light source 102 capable of emitting the desired wavelength of electromagnetic radiation for photopolymer curing (e.g., crosslinking), in the desired areas of the build area dynamically.

Rotary Separation Vessel (RSV)

The RSV 103 illustrated in FIG. 1 can be an example of a device for continuously rotating the area of separation (e.g., area of the vessel membrane floor 104 that a layer of photopolymer is cured against) during the printing process. With a RSV 103, an object can be continuously manufactured without requiring the build plate 105 to stop or reverse direction for an oxygenation step. The RSV 103 comprises a gas permeable membrane floor 104, with a solid and transmissive backing, which can be continually exposed to oxygen during the printing process, reducing the separation force post curing of the photopolymer. An example of a material for the membrane floor 104 is polydimethylsiloxane (PDMS) but the membrane floor 104 may be any material which allows for oxygen presence at the surface of the vessel membrane floor 104. The vessel 103 allows for the transmission of electromagnetic radiation through its lower surface (i.e., the membrane floor). The RSV 103 comprises sides 114 (e.g., that define a space) that can contain the photopolymer 115 when installed in the 3D printing device. When installed, the RSV's mounting and position is such that the membrane floor 104 is tilted with reference to the earth (e.g., a direction of gravity or level surface) such that the photopolymer 115 collects (under the influence of gravity) at a point 302 lower toward the earth while a higher point 300 can be free of polymer and exposed to oxygen.

The RSV 103 can optionally include a wiper 400 (FIG. 4) which may, for example, be made of silicone. The wiper 400 can be in contact with the vessel/membrane floor 104. The wiper 400 can be configured to aid in removing photopolymer residue from the membrane floor 104. This increases the time that the membrane 104 is in contact with (e.g., exposed to) the surrounding oxygen. Optionally, the RSV 103 may comprise an permeation device 402 which comprises a silicone vent (not shown) through which an oxygen rich gas can be pumped and directed at the vessel floor 104. This increases the amount of oxygen available to permeate the membrane 104.

As the underside of the vessel is optically clear, the photopolymer 115 (e.g., resin) is exposed to light from the bottom side, e.g., light can enter through a bottom side of the container (e.g., vessel or RSV) by passing through the membrane 104 and contact a portion of the photopolymer 115. The photopolymer 115 that is located between an upper side of the flat membrane 104 and a bottom surface of the build plate 105 (e.g., pressed against an upper side of the flat membrane 104) can be exposed to the light source and become hardened (e.g., cured) due to photo-initiators in the photopolymer's chemical composition. This flat cured area can be referred to as a "slice" or "layer" of the printed object. For example, with reference to UV or other spectrum light, the photopolymer 115 can become polymerized as it is irradiated by electromagnetic radiation with a wavelength within the UV or other relevant spectrum.

During the additive manufacturing process, as each section of cross-sectional surface area is cured, the cured resin becomes attached to (e.g., suctioned onto) the membrane 104 due to a shrinkage of the resin, which can create an area of low pressure beneath a cured area and van der Waals forces to a lesser extent. After the resin has cured, the build plate 105 can be lifted away from the membrane 104 to separate the cured resin from the membrane 104. The presence of oxygen prevents the photopolymer 115 from hardening, thus having a layer of oxygen present at the surface of the membrane 104 allows a thin layer of photopolymer 115 to remain uncured. This unhardened or uncured photopolymer 115 reduces the contact area between the cured photopolymer and the membrane 104 window which in turn reduces the separation force between the cured photopolymer and the membrane 104. This increases the overall print speed significantly as the printing process can happen continuously, e.g., without turning off the light to pause the curing process. Devices and methods described herein maintain that oxygen layer throughout the printing process where otherwise it can deplete over time.

The build plate 105 can lift a sufficient distance (e.g. along the direction of arrow 306) for the next image exposure/curing so that each layer happens successively one after the other with no intermediate steps. Due to the membrane 104 having oxygen at its surface (e.g., due to its relatively high gas permeability and the rotary stage continuously exposing it, e.g., by rotating the membrane in the direction of arrow 304 to expose different portions of the membrane 104 between curing cycles, to the surrounding oxygen preventing oxygen depletion), the part (e.g., layer(s) of cured photopolymer) can gently move away (e.g., become separated from) the membrane 104 without applying a force that damages the fabricated layer of cured photopolymer. As the separation force (e.g., force used to separate the cured photopolymer from the membrane floor) is reduced by the presence of oxygen the build plate 105 can move upwards a desired amount for the next image exposure without having to move further away from the membrane floor 104 to achieve a greater separation force or having to actuate an intermediate step (e.g., turning off the light) to aid in separation or oxygenation.

In embodiments described herein, the rotation speed of the RSV 103 is controllable, e.g., by a processor 113, and can be optimised to allow for increased oxygen exposure and reduced damage to the PDMS. It can be shown through testing that the separation force between a cured layer of photopolymer and a membrane 104 increases upon subsequent exposure of the same area of the membrane 104 multiple times. Devices and methods described herein enable the membrane 104 to be exposed to oxygen for a controllable amount of time prior to being re exposed upon a subsequent time.

The vessel 103 or container design is such that it can be manufactured in a number of ways and/or a combination of methods can be employed. For example, the vessel 103 and/or container can be injection moulded and sub-components such as the membrane floor 104 can be poured in liquid form and allowed to set hard. The vessel 103 and/or other components of the additive manufacturing device 100 may be made of any suitable material which can withstand exposure and contact to the photopolymer 115 or any combination of suitable materials such as, for example, Polypropylene, acrylic, silicone and glass.

Certain advantages associated with the vessel/container assembly of the present disclosure (e.g., the RSV) include the membrane floor of the vessel is repeatedly (e.g., continuously) exposed to oxygen. This reduces the interaction of separation forces between the printed object and the membrane floor, allowing for separation without impeding and/or stopping the curing process. Further advantages associated with the vessel/container assembly of the present disclosure (e.g., the RSV) include the continuous or repeated oxygenation does not impede or stop the printing process. Still further advantages associated with the vessel/container assembly of the present disclosure (e.g., the RSV) include the membrane floor being fully supported with a rigid backing while achieving continuous oxygenation.

Still further advantages associated with the vessel/container assembly of the present disclosure (e.g., the RSV) include providing a layer of oxygen continuously maintained between the vessel floor and the photopolymer. This reduces the contact area between the cured photopolymer and the vessel floor and thus reduces any vacuum force which may arise through direct contact creating a seal between the two. During the curing process, oxygen will be used up due to its involvement in naturally inhibiting the curing of the photopolymer and thus the device and methods described herein are designed to provide a continuous oxygen gas interface.

Still further advantages associated with the vessel/container assembly of the present disclosure (e.g., the RSV) include the membrane floor of the vessel is supported by a rigid backing of sufficient mechanical strength to prevent deformation of the membrane. This backing is optically clear and UV transmissive. Example materials for the backing include acrylic and glass and FEP.

Printer Device Use and Operation

In operation, a user can plug in (e.g., connect a power source to) a manufacturing device (e.g., the 3D printer shown in FIGS. 1-7, or any other embodiments described herein). The user then loads a 3D object file onto the device, e.g., using software installed on a processor of the device.

The user can select various settings relative to the particular print and photopolymer in use. The user can start the print via an interaction of software and hardware (e.g., via a user interface, such as visual and/or audio user interface), which can be described in an operating manual. During operation, the manufacturing device 100 (e.g., via the light source 102) dynamically changes the photomask/layer image 101 as needed. While this is happening, the build plate 105 is moving upwards (e.g. away from the membrane 104) at a predetermined rate, e.g., in software settings that was saved to a file. During operation, the RSV 102 is rotating to enable continuous or repeated oxygenation of the membrane floor 104 and to also prevent the photopolymer 115 from exposing in the same area of the membrane floor 104 twice consecutively.

Figure 8:
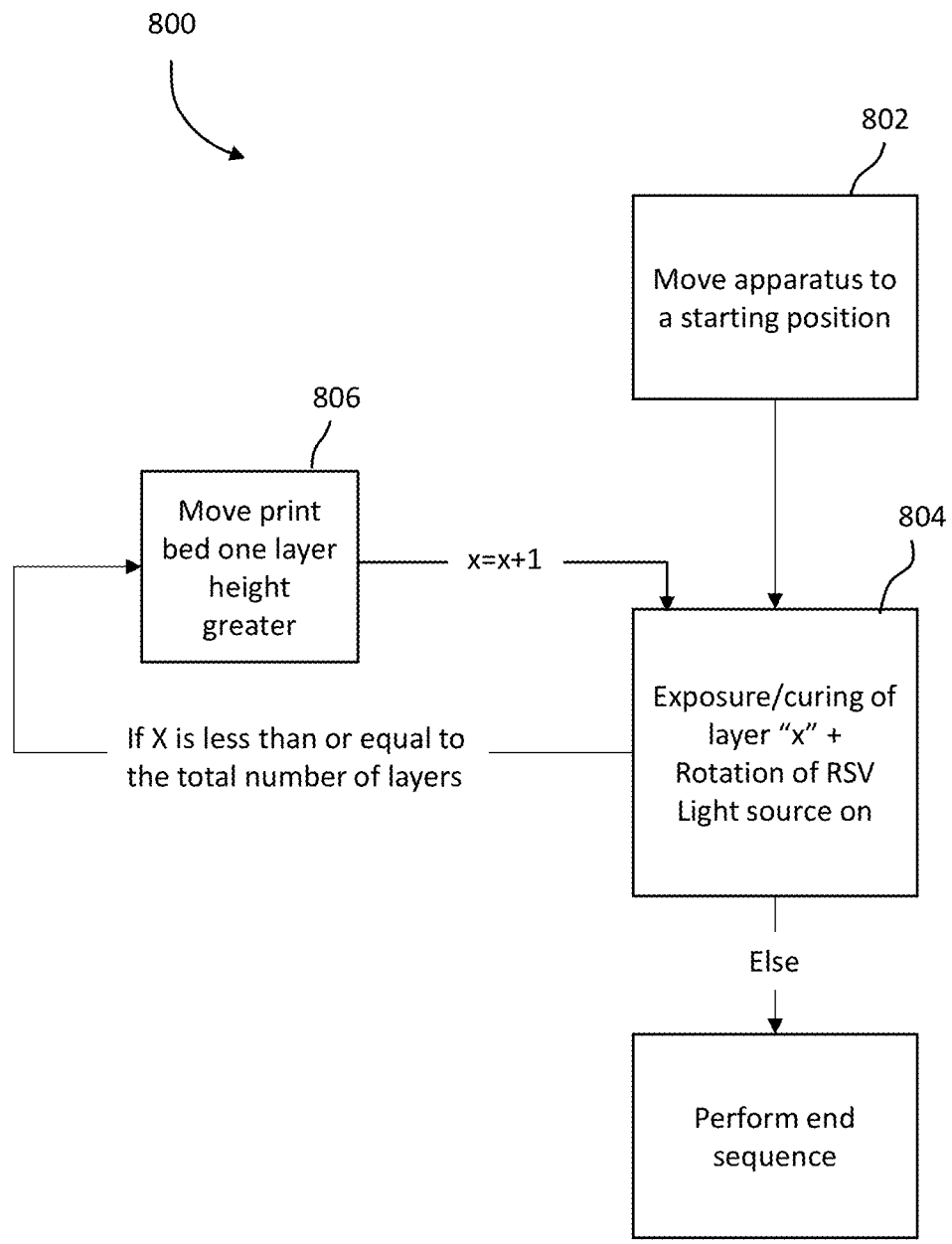
FIG. 8 is a flow diagram depicting an example operational flow of a manufacturing device, according to embodiments.

FIG. 8 depicts an example of the operation of a method 800 of operating a manufacturing device 100, according to embodiments described herein. The method 800 starts in block 802 where the device is moved to a starting position. This may include moving the end effector and/or the print-bed/build-plate for example. The method 800 then proceeds to block 804 where the light source is activated to cure the photopolymer while the RSV 103 is rotated. When the current layer is not the last layer (e.g. layer "X" is less than the total number of layers), the method 800 loops to block 806 where the print-bed/build-plate is moved a distance equal to one layer height or greater.

Figure 9:
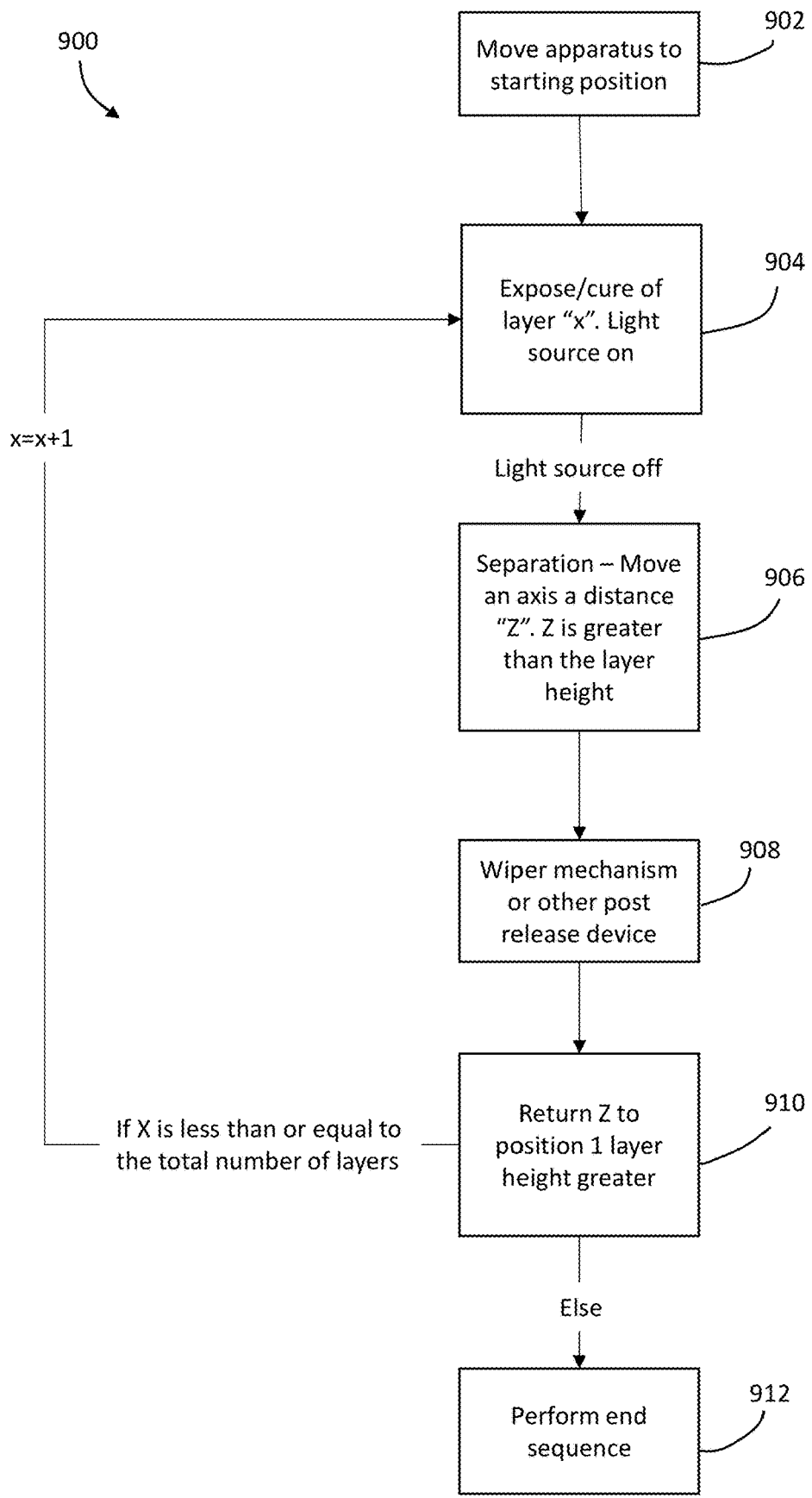
FIG. 9 is a flow diagram depicting an example operational flow of a manufacturing device, utilising a non-continuous printing method incorporating a separation step in the process requiring the light source to be turned off, in accordance with an embodiment.

Referring now to FIG. 9 an embodiment is shown of a method 900 for operating the additive manufacturing device 100. The method 900 is started in block 902 where the RSV 103 is moved to a starting position, such as with the wiper 400 positioned away from or out of the cure area 302. The method 900 then proceeds to block 904 where the light source 102 is activated to cure a layer of the photopolymer. In some embodiments the method 900 then moves to block 906 where the light source is turned off and the move the build plate 105 is moved to separate the cured polymer from the membrane floor. In an embodiment, the amount moved is greater than the layer height. In other embodiments, the light source 102 remains on. The method 900 then proceeds to block 908 where the wiper mechanism 400 and optionally the permeation device 402. The method 900 then proceeds to block 910 where the build plate 105 is moved back to a position where the bottom surface of the cured polymer is equal to one layer height. If the current layer is not the last layer (e.g. the layer "X" is less than the total number of layers), the method 900 loops to block 904 the process continues. Otherwise the method 900 proceeds to block 912 where the process ends.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various methods and/or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers/compute device and/or other processors to implement various aspects of the present disclosure as discussed above.

The terms "program" or "software" are used herein in a general sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure can be distributed in a modular fashion amongst a number of different compute devices/processors to implement various aspects of the disclosure.

Processor-executable instructions can be in many forms, such as program modules, executed by one or more compute devices, and can include routines, programs, objects, components, data structures, etc. that perform particular tasks or implement particular data types, and the functionality can be combined and/or distributed as appropriate for various embodiments.

Data structures can be stored in processor-readable media in a number of suitable forms. For simplicity of illustration, data structures may be shown to have fields that are related through location in the data structure. Such relationships can likewise be achieved by assigning storage for the fields with locations in a processor-readable medium that conveys relationship(s) between the fields. However, any suitable mechanism/tool can be used to establish a relationship between information in fields of a data structure, including through the use of pointers, tags or other mechanisms/tools that establish relationship between data elements.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An additive manufacturing device comprising:
   a vessel configured to rotate about an axis;
   a membrane disposed to form a floor of the vessel, wherein the axis is arranged on an angle relative to gravity and perpendicular to the floor;
   a build plate movable between a first position and a second position, the build plate being positioned a predetermined distance apart from the membrane in the first position;
   a light source arranged to direct electromagnetic radiation through the membrane towards the build plate;
   a processor that is responsive to executable computer instructions for rotating on a periodic, aperiodic, or continuous basis, the vessel to oxygenate the membrane; and
   wherein vessel is disposed on a fixed angle during operation, and the membrane having a cure area and an oxygenation area, the cure area being vertically lower than the oxygenation area.

2. The additive manufacturing device of claim 1, wherein the build plate has a bottom surface that is parallel with the membrane.

3. The additive manufacturing device of claim 1, wherein the light source is arranged to direct electromagnetic radiation perpendicular to the membrane.

4. A method of fabricating a 3D object, the method comprising:
   providing a vessel having a floor at least partially defined by a membrane;
   rotating the vessel about an axis on a periodic, aperiodic or continuous basis to oxygenate the membrane, wherein the axis is arranged on an angle relative to gravity and perpendicular to the floor;
   moving a build plate a predetermined distance from the membrane;
   disposing a photopolymer in the vessel;
   emitting electromagnetic radiation through the membrane into at least a portion of the photopolymer; and
   disposing the vessel on a fixed angle during operation to define a cure area and a oxygenation area, the cure area being vertically lower than the oxygenation area, the photopolymer being disposed in the cure area.

* * * * *